(12) United States Patent
Fischer

(10) Patent No.: US 6,712,386 B2
(45) Date of Patent: Mar. 30, 2004

(54) INFLATABLE SIDE IMPACT AIRBAG

(75) Inventor: Anton Fischer, Leinweiler (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/128,027

(22) Filed: Apr. 22, 2002

(65) Prior Publication Data

US 2002/0153713 A1 Oct. 24, 2002

(30) Foreign Application Priority Data

Apr. 23, 2001 (DE) .......................... 101 19 770

(51) Int. Cl.[7] .............................. B60R 21/22
(52) U.S. Cl. ................. 280/730.2; 280/743.1
(58) Field of Search .............. 280/728.2, 730.02, 280/743.1, 749

(56) References Cited

U.S. PATENT DOCUMENTS

| | | | | |
|---|---|---|---|---|
| 5,458,367 A | * | 10/1995 | Marts et al. | 280/730.1 |
| 5,730,463 A | * | 3/1998 | Fisher et al. | 280/743.1 |
| 5,884,937 A | * | 3/1999 | Yamada | 280/730.2 |
| 5,984,348 A | * | 11/1999 | Specht et al. | 280/730.2 |
| 6,220,623 B1 | * | 4/2001 | Yokota | 280/728.2 |
| 6,371,512 B1 | * | 4/2002 | Asano et al. | 280/730.2 |
| 6,451,715 B2 | * | 9/2002 | Li et al. | 442/76 |
| 6,575,496 B2 | * | 6/2003 | Hess et al. | 280/730.2 |
| 2002/0158450 A1 | * | 10/2002 | Hoeft et al. | 280/730.2 |

FOREIGN PATENT DOCUMENTS

DE 19823492 12/1999

* cited by examiner

Primary Examiner—Paul N. Dickson
Assistant Examiner—Laura B. Rosenberg
(74) Attorney, Agent, or Firm—Tarolli, Sundheim, Covell & Tummino L.L.P.

(57) ABSTRACT

An inflatable side impact airbag for a vehicle occupant protection device comprises an upper edge to attach it in the area of an A-column and of a roof frame of a motor vehicle. The upper edge of the airbag is straight. Further, there is proposed a method of installing such an airbag.

2 Claims, 2 Drawing Sheets

INFLATABLE SIDE IMPACT AIRBAG

TECHNICAL FIELD

The invention relates to an inflatable side impact airbag for a vehicle occupant protection means.

BACKGROUND OF THE INVENTION

Conventional side impact airbags (e.g. DE 296 16 904) comprise an upper edge to attach it in the area of an A-column and of a roof frame of a motor vehicle. The invention also relates to a method of installing such a side impact airbag in the area of the A-column and of the roof frame of the motor vehicle. The upper edge is attached in the area of the A-column and of the roof frame in a vehicle. In this arrangement, the airbag is designed such that the upper edge of its contour is adapted to the shape of the A-column. In the non-activated state of the protective device, the airbag is stowed folded along the roof frame and the A-column. However, such folding is relatively complicated to realize. It would be simpler to roll up the airbag all the way to its upper edge. However, due to the curvature of the upper edge, this is not possible without also rolling up a part of the edge. Since the airbag, however, has to be attached to the vehicle across the entire length of the edge, the edge must not be rolled up together with the airbag.

The object of the invention is to provide a side impact airbag that can be rolled up crease-free all the way to its upper edge and that can be attached with this edge in the area of the A-column and of the roof frame of a motor vehicle.

BRIEF SUMMARY OF THE INVENTION

According to the invention, an inflatable side impact airbag for a vehicle occupant protection device comprises an upper edge to attach it in the area of an A-column and of a roof frame of a motor vehicle. The upper edge of the airbag is straight. The airbag proposed can be rolled up straight and without creasing all the way to its upper edge, resulting in an elongated tube. On installation, this tube can be curved without any problem in such a way that it adapts to the curvatures of the A-column and of the roof frame. Nevertheless, the side impact airbag can easily be unrolled by means of inflation so that it covers, for example, the side windows in the area between the A-column and the C-column.

According to another aspect, the invention also provides a method of installing a side impact airbag according to the invention in the area of the A-column and of the roof frame of the motor vehicle. Through the method, the side impact airbag is rolled up towards the upper edge to form a roll which has an axis that is parallel to the upper edge. The roll is adapted to the curvature of the A-column and of the roof frame, and the upper edge of the roll is attached to the A-column and to the roof frame. Since the airbag is not folded but rather only rolled up and can be easily adapted to the curvatures of the A-column and of the roof frame, installation is much faster and easier to carry out.

Additional advantageous embodiments of the invention will be apparent from the subordinate claims.

DETAILED DESCRIPTION OF THE PREFERRED EMBODIMENT

Figure 1:
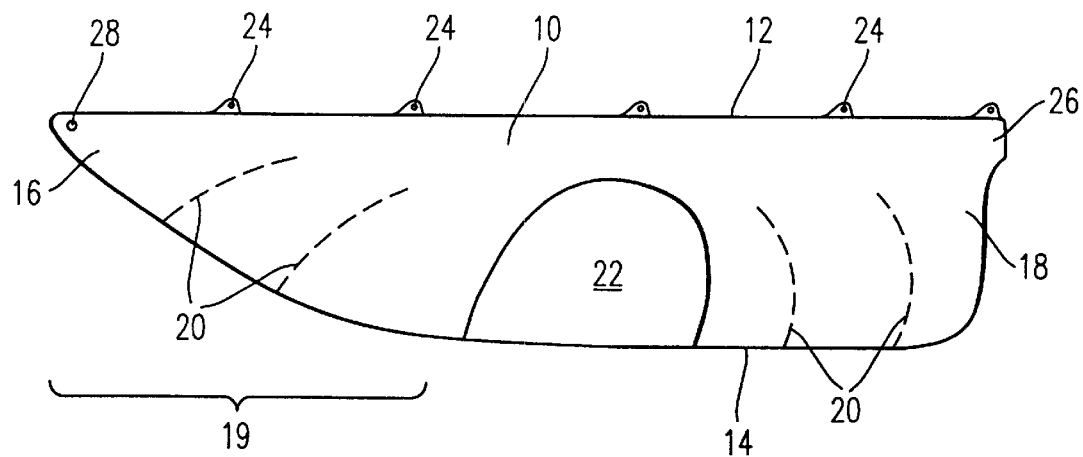
FIG. 1 is a view of the side impact airbag according to the invention in a state spread out flat.

FIG. 1 shows a side impact airbag 10 that is spread out flat and that covers a surface area that essentially has the shape of a pentagon which was made of a rectangle with one corner cut off. The side impact airbag 10 has an upper edge 12, a lower edge 14, a front end 16 (in the Figures on the left) and a back end 18. The side impact airbag 10 can be made, for example, of a double-layered piece of fabric and can be provided with stitched seams 20 and non-inflatable areas 22 as shown in FIG. 1, as is well known to the person skilled in the art. The upper edge 12 runs in a straight line, whereas the lower edge 14 runs from the back end 18 to about the front third 19 of the side impact airbag 10 essentially parallel towards the upper edge 12, and in the front third 19 in an arc towards the upper edge 12, so that, at the front end 16, the upper edge 12 and the lower edge 14 meet at an acute angle. At the upper edge 12, attachment tabs 24 are formed which are provided with holes and which serve to attach the side impact airbag 10 in a motor vehicle. At the back end 18, there is an inflow opening 26 through which the side impact airbag 10 can be filled with gas from a source of pressurized gas. A further attachment hole 28 is situated at the front end 16 in the gusset between the upper edge 12 and the lower edge 14.

Figure 2:
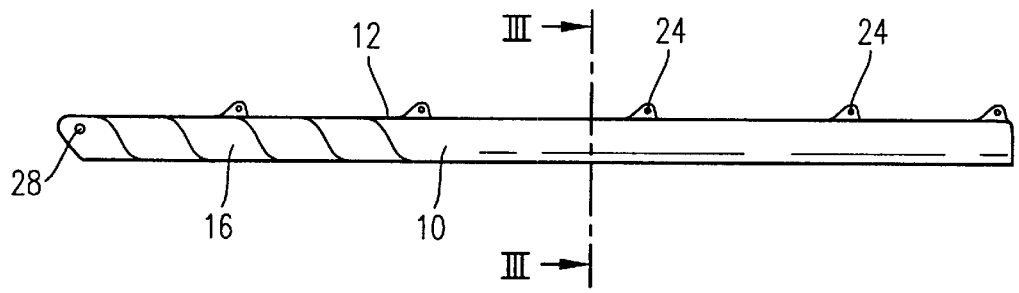
FIG. 2 is a view of the side impact airbag of FIG. 1 in a rolled-up state.
Figure 3:
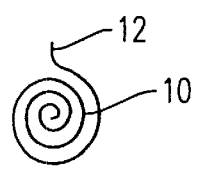
FIG. 3 shows a cross-section through the airbag of FIG. 2 along the line III—III in FIG. 2.
Figure 4:
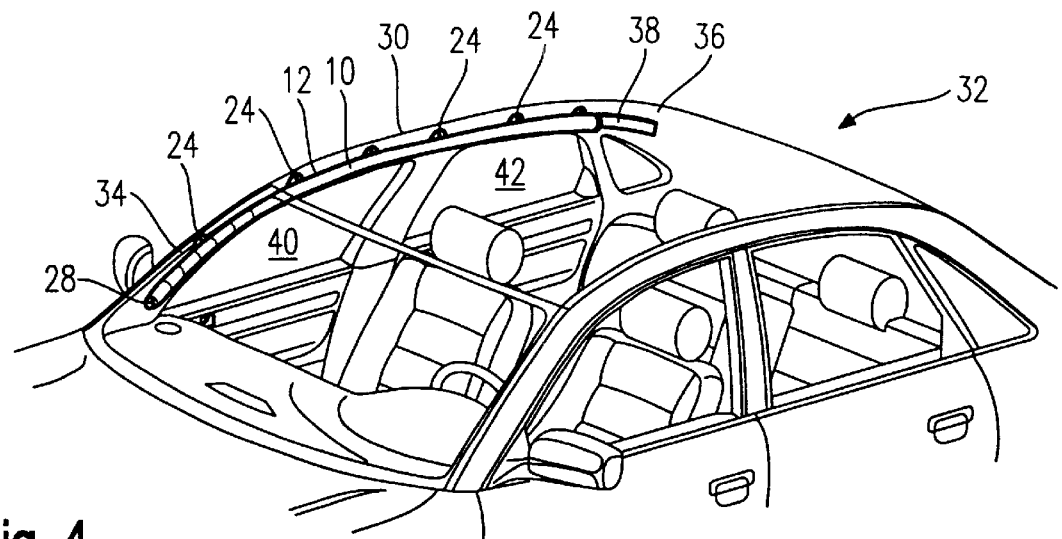
FIG. 4 is a perspective view of a motor vehicle with a side impact airbag according to the invention in the rolled-up state.
Figure 5:
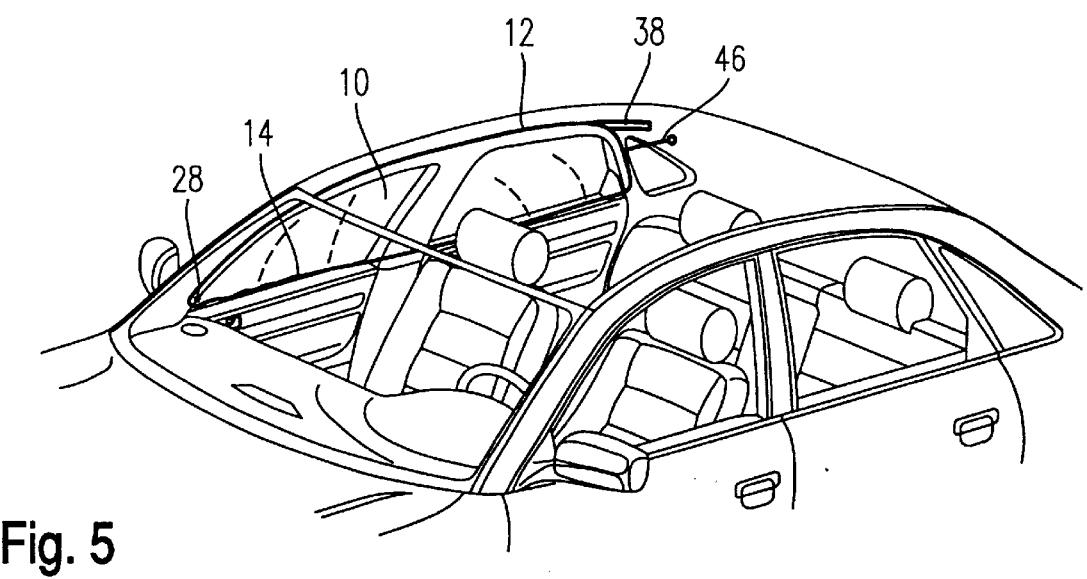
FIG. 5 is a perspective view of the vehicle from FIG. 4 with the side impact airbag according to the invention in the inflated state.

The side impact airbag 10 is part of a vehicle occupant protective means that is installed in a vehicle 32 (FIGS. 4 and 5). In order to install the side impact airbag 10, it can be rolled up from the lower edge 14 in a simple manner parallel towards the upper edge 12, straight and without creasing, so that a uniform roll is formed whose axis is parallel towards the upper edge 12, as can be seen clearly in FIGS. 2 and 3. The rolled-up airbag 10, as shown in FIG. 4, can be attached by means of the attachment tabs 24 and the attachment hole 28 to the roof frame 30, and in the front third 19 to the A-column 34 of the vehicle 32. In so doing, the rolled-up side impact airbag 10, due to its flexibility, adapts like a tube to the curvature of the roof frame, especially in the area of the A-column 34 and at the transition to the C-column 36. The side impact airbag is mounted in such a way that its front end 16 lies at the front, as seen in the driving direction, and is attached through the attachment hole 28 to the lower end of the A-column.

Figure 6:
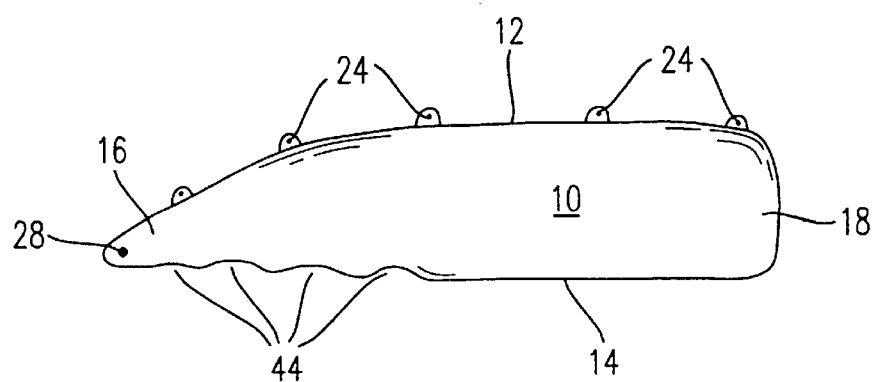
FIG. 6 is a view of the side impact airbag of FIG. 4 in the unrolled state.

When the vehicle occupant protective means is actuated, the side impact airbag 10 is inflated by gas from a gas generator 38, thereby unrolling downwards over the side windows 40 and 42 of the vehicle. In the unrolled and inflated state, the upper edge 12 of the side impact airbag 10 follows the curvature of the roof frame 30 from the A-column 34 to the C-column 36 (FIGS. 5 and 6). Characteristically, through the curvature of the upper edge 12 in the front third of the side impact airbag 10, a slack region 44 is formed at the lower edge 14, but this does not impair the function of the side impact airbag 10.

As can be clearly seen in FIGS. 5 and 6, the side impact airbag 10 advantageously covers the entire area of the side window 40 up to the A-column 34, so that it can also fulfill its protective effect for a vehicle occupant who is, for example, leaning forward. Nevertheless, the side impact airbag 10 does not have to be folded in a complicated manner, but rather can advantageously be simply rolled up. This advantageous possibility of rolling up arises merely from the fact that the upper edge 12 runs in a straight line when the airbag is spread out flat. If the upper edge of the airbag were cut to fit the contour of the roof frame 30, then the attachment hole 28 and the attachment tabs 24 would be rolled up as well in the area of the A-column 34, which, however, would make it impossible to unfold the side impact airbag 10 in the front area.

Aside from the fact that it is simpler to do, rolling the side impact airbag 10 has the additional advantage over folding that the side impact airbag 10 unrolls along the side windows 40 and 42 when it is being inflated and cannot, for example, due to unfavorable flow conditions or stuck folds, move into the passenger compartment.

Advantageously, the side impact airbag 10 is rolled up in such a way that the side of the airbag facing the vehicle interior when the airbag is in the installed and inflated state forms the outside of the roll. This has the advantage that a whiplash effect is avoided during inflation when the roll expands into the interior of the vehicle. Rather, the roll slides downward along the side windows 40 and 42 when it unrolls, so that the head of a vehicle occupant, even if he/she is not seated in the optimal sitting position, cannot end up between the side impact airbag 10 and the side window 40, 42.

In order to better stabilize the side impact airbag 10 in the inflated state, the airbag in the area of the C-column 36 can also be attached to the C-column by a tether 46 fastened to the back end 18.

What is claimed is:

1. An inflatable side impact airbag for a vehicle occupant protection device for inflating along one side of a vehicle to help restrain an occupant, said side impact airbag comprising an upper edge for attachment in the area of an A-column and of a roof frame of a motor vehicle, said upper edge of said airbag being straight, said airbag forming a roll that has an axis which is parallel to said upper edge, and an outer side surface of said side gas bag, in an installed and inflated condition of said side gas bag, faces in a direction toward an inside of said vehicle and away from the one side of the vehicle and forms an outside surface of said roll.

2. A method of installing a side impact airbag in the area of an A-column and of a roof frame of a motor vehicle for inflating along one side of a vehicle to help restrain an occupant, said side impact airbag comprising an upper edge for attachment in said area of said A-column and of said roof frame of said motor vehicle, said upper edge of said airbag being straight, said method comprising the steps of:

rolling said side impact airbag being rolled up towards said upper edge to form a roll that has an axis which is parallel to said upper edge and adapted to a curvature of said A-column and of said roof frame and an outer side surface of said side gas bag, in an installed and inflated condition of said side gas bag, faces in a direction toward an inside of said vehicle and away from the one side of the vehicle and forms an outside surface of said roll and attaching said upper edge of said roll to said A-column and to said roof frame.

* * * * *